United States Patent
Le Moigne et al.

(10) Patent No.: US 9,434,394 B2
(45) Date of Patent: Sep. 6, 2016

(54) AXLEBOX ASSEMBLY

(71) Applicants: Thierry Le Moigne, Luynes (FR); Arnaud Turmeau, Mallisard (FR)

(72) Inventors: Thierry Le Moigne, Luynes (FR); Arnaud Turmeau, Mallisard (FR)

(73) Assignee: AKTIEBOLAGET SKF, Gothenburg (SE)

( * ) Notice: Subject to any disclaimer, the term of this patent is extended or adjusted under 35 U.S.C. 154(b) by 230 days.

(21) Appl. No.: 14/244,453

(22) Filed: Apr. 3, 2014

(65) Prior Publication Data
US 2015/0284013 A1  Oct. 8, 2015

(30) Foreign Application Priority Data
Apr. 3, 2013  (EP) ..................... 13305427

(51) Int. Cl.
 *B61F 5/00* (2006.01)
 *B61F 5/28* (2006.01)

(52) U.S. Cl.
 CPC ....................... *B61F 5/28* (2013.01)

(58) Field of Classification Search
 CPC .............. B61F 5/28; B61F 5/30; B61F 5/32; B61F 5/34
 See application file for complete search history.

(56) References Cited

U.S. PATENT DOCUMENTS

| | | | | |
|---|---|---|---|---|
| 2,418,398 A | * | 4/1947 | Cottrell | B61F 15/14 105/223 |
| 2,634,178 A | * | 4/1953 | Chievitz | B21B 31/07 384/583 |
| 2,981,574 A | * | 4/1961 | David | B61F 15/12 105/221.1 |
| 3,028,820 A | * | 4/1962 | Fannce | B60B 37/10 105/197.05 |
| 4,286,830 A | * | 9/1981 | Salter, Jr. | B21B 31/074 384/584 |
| 4,613,240 A | * | 9/1986 | Hagelthorn | F16C 35/063 384/583 |
| 5,572,931 A | * | 11/1996 | Lazar | B61F 5/26 105/218.1 |
| 5,746,137 A | * | 5/1998 | Hawthorne | B61F 5/26 105/218.1 |
| 5,794,538 A | * | 8/1998 | Pitchford | B61F 5/32 105/218.1 |
| 2006/0251352 A1 | * | 11/2006 | Reed | B61F 15/22 384/477 |
| 2015/0284013 A1 | * | 10/2015 | Le Moigne | B61F 5/28 105/199.1 |

\* cited by examiner

*Primary Examiner* — Jason C Smith
(74) *Attorney, Agent, or Firm* — Bryan Peckjian; SKF USA Inc. Patent Dept.

(57) ABSTRACT

An axlebox assembly having at least one rolling bearing designed to be mounted on an axle, and a cover designed to be fastened with the axle such as to axially maintain the at least one rolling bearing between the cover and an abutment of the axle is provided. A backing ring is mounted on the axle between the at least one rolling bearing and the abutment. The backing ring includes a deformable portion so as to substantially fit the shape of the abutment of the axle.

14 Claims, 3 Drawing Sheets

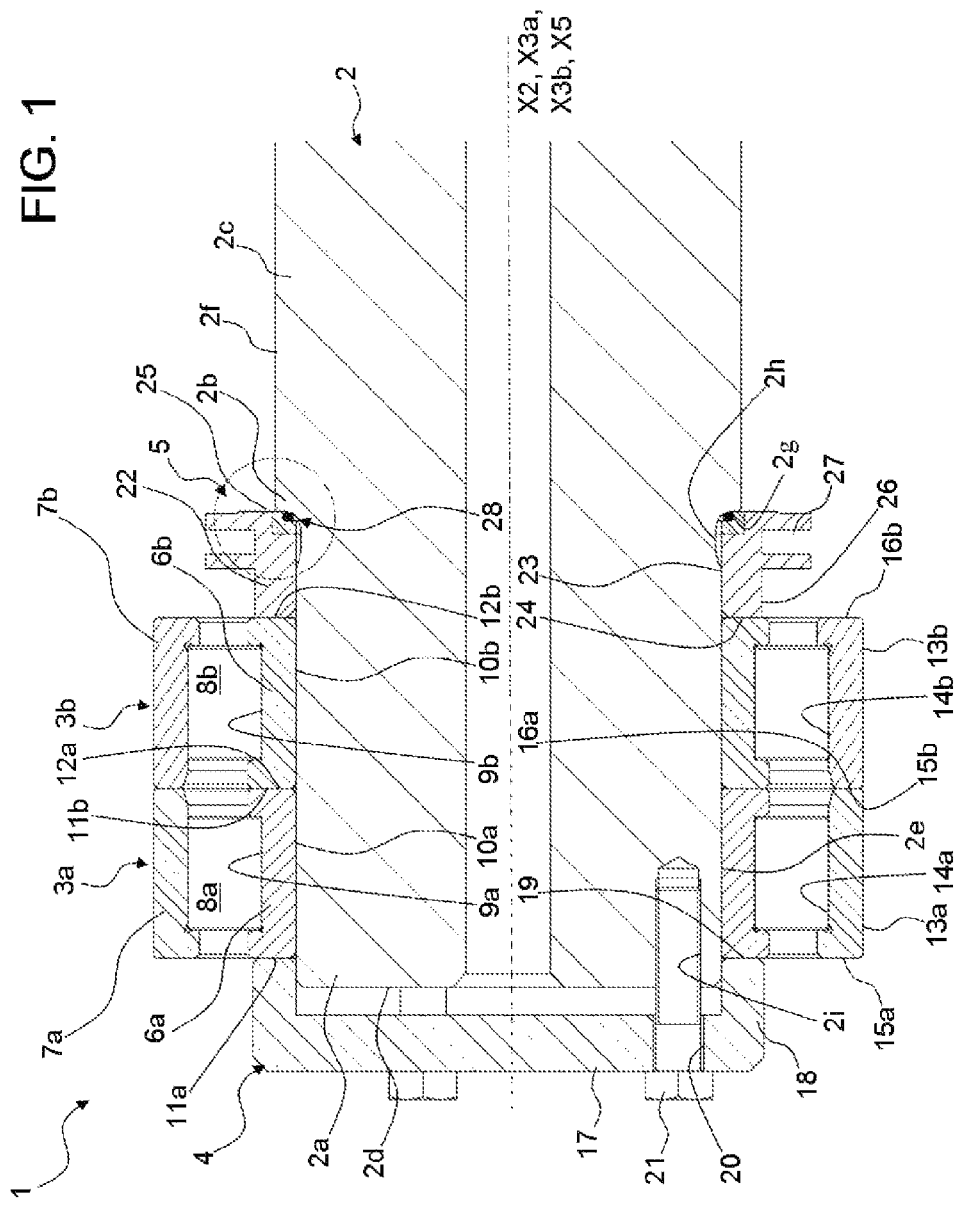

AXLEBOX ASSEMBLY

CROSS-REFERENCE TO RELATED APPLICATIONS

This application claims priority to European Patent Application No. EP13305427 filed Apr. 3, 2013, the contents of which are hereby fully incorporated by reference.

FIELD OF THE INVENTION

The invention relates to an axlebox assembly for railway vehicles as used e.g. in bogies of trains and tramways having rolling bearing units.

BACKGROUND OF THE INVENTION

A railway bogie may include a wheel set having an axle provided with wheels and an axlebox assembly wherein rolling bearings are mounted for supporting the rotating axle; a railway bogie frame which can support a wagon body; and suspensions mounted on axlebox arms and connected to the railway bogie frame.

The rolling bearings may be mounted on an axle end and axially maintained between an abutment provided on the axle end and a cover fastened with the axle. The rolling bearings are surrounded by a housing of the axlebox assembly.

A backing ring may be mounted between the rolling bearings and the axle abutment for equally distributing the load during the rolling bearings press fitting process on the axle end.

The axle abutment consists in a shoulder between the axle end having a smaller outer diameter than the adjacent axle portion. The shoulder comprises a radial surface bearing against the backing ring. The said radial surface extends radially with a rounded groove on the axle end for avoiding stress concentration in the shoulder corner.

However, the radial surface has a small radial length that limits the contact surface with the backing ring and then limits the load exerted during the rolling bearings press fitting process. Indeed, the parts may be plastically deformed in case of excessive load during the mounting process of the rolling bearings whereas an insufficient load leads to tolerance issues.

It is therefore a particular object of the present invention to overcome these aforementioned drawbacks by providing an axlebox assembly of simple design with a reduced number of components that is easy to assemble, economical, able to operate for a long time in both an effective and an economic manner.

SUMMARY OF THE INVENTION

The invention concerns an axlebox assembly comprising at least one rolling bearing designed to be mounted on an axle, a cover designed to be fastened with the axle such as to axially maintain the at least one rolling bearing between the said cover and an abutment of the axle, and a backing ring mounted on the axle between the at least one rolling bearing and the axle abutment.

According to the invention, the backing ring comprises a deformable portion so as to substantially fit the shape of the abutment of the axle.

Thanks to this invention, the backing ring comes into contact with the axle abutment during the mounting process and is deformed such as to improve the surface contact dimension with the abutment, even if it is of complex shape comprising linear or rounded portions.

The abutment shape can then be designed only by considering an optimized stress distribution since the backing ring substantially fits the shape.

An increased load can be uniformly exerted on the rolling bearings, and then the backing ring, during the press fitting process. The tolerance issue in final mounting is then improved.

Moreover, the backing ring transmits the axial loads exerted from the cover and the lateral loads from a switch rail, for example, during the train use. A large contact surface between the backing ring and the axle abutment permits to increase the preload on the rolling bearings and then to reduce their micro-displacements on the axle that could create wear.

According to further aspects of the invention, which are advantageous but not compulsory, such a rolling bearing may incorporate one or several of the following features as long as there is no contradiction:

- The axlebox assembly comprises two rolling bearings axially adjacent mounted on the axle.
- The axlebox assembly comprises one rolling bearing comprising at least two rows of rolling elements.
- The rolling bearings each comprise an inner ring press-fitted on the axle, an outer ring and at least one row of rolling elements between the inner and outer rings.
- The rolling elements are rollers.
- The rolling elements are circumferentially maintained by a cage.
- The rolling elements are circumferentially maintained by individual spacers, each being located between two adjacent rolling elements.
- The cover is fastened with the axle by screws.
- The cover comprises a plate axially extended by a rim towards the rolling bearings.
- The cover plate comprises at least one hole wherein a screw is engaged to cooperate with the axle.
- The rim is in radial contact with the inner ring of a rolling bearing in order to axially retain it on the axle.
- The backing ring is in radial contact with the inner ring of a rolling bearing and in contact with the axle abutment.
- The abutment of the axle consists in a shoulder between an axle end having a smaller outer diameter than the adjacent axle portion. The shoulder comprises a radial surface bearing against the backing ring. The said radial surface extends radially with a rounded groove on the axle end on which the deformable portion of the backing ring substantially fits.
- The deformable portion of the backing ring is made on an elastic material.
- The backing ring comprises a main body made of a metallic material and a deformable portion made of an elastic material and fastened with the said main body.
- The deformable portion comprises a radial rim inwardly extending and in contact with the axle abutment.
- The deformable portion comprises an annular inner groove defining a deformable rim in contact with the axle abutment.
- The rim of the deformable portion extends radially in its free state before the backing ring mounting on the axle and is then deformed after mounting against the axle abutment.
- The deformable portion comprises an elastic ring inserted in the inner groove.
- The main body and the deformable portion of the backing ring are both in contact with the axle abutment.

The deformable portion is the only component of the backing ring to be in contact with the axle abutment.

The inner diameter of the groove bottom of the deformable portion is strictly smaller than the outer diameter of the axle abutment The inner diameter of the groove bottom of the deformable portion is closer to the diameter of the junction between the radial surface and the groove of the shoulder of the axle than the outer diameter of the axle shoulder.

The elastic material of the deformable portion and/or the elastic ring is a spring metal.

The elastic material of the deformable portion and/or the elastic ring is a polymer.

The elastic material of the deformable portion and/or the elastic ring has a Young's modulus comprised between 200 and 500 MPa.

The invention also concerns a railway bogie comprising an axle and an axlebox assembly according to one the previous embodiments.

BRIEF DESCRIPTION OF THE DRAWINGS

The present invention and its advantages will be better understood by studying the detailed description of specific embodiments given by way of non-limiting examples and illustrated by the appended drawings on which:

FIG. 1 is an axial section of an axlebox assembly according to a first embodiment of the invention;

DETAILED DESCRIPTION OF THE INVENTION

Figure 2A:
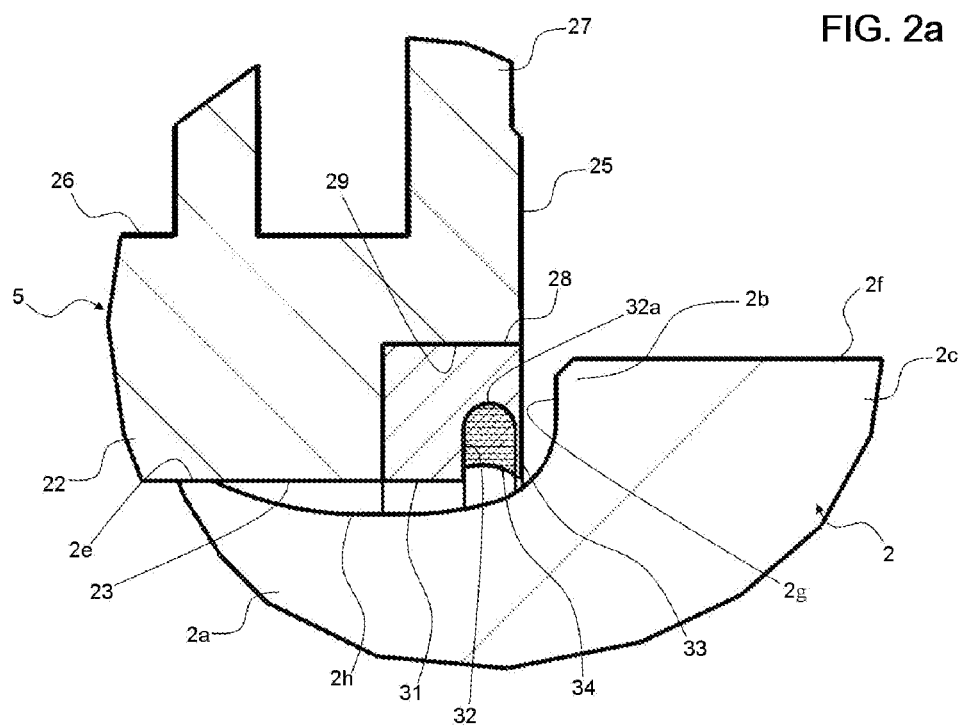
FIG. 2a is a detailed view of a deformable portion according to a first embodiment of the invention in a free state.

Referring first to FIG. 1, which illustrate a first embodiment of an axlebox assembly according to the invention, an axlebox assembly 1 is mounted on a rotating axle 2 of axis X2.

The axle 2 comprises an axle end 2a delimited by an outer circumferential shoulder 2b and a main portion 2c. The axle end 2a comprises a lateral radial surface 2d and an outer surface 2e. The main portion comprises an outer surface 2f which has an outer diameter strictly higher than the outer diameter of the outer surface 2e of the axle end 2a.

The shoulder 2b defines a radial surface 2g extended by a groove 2h of rounded shape provided on the outer surface 2e of the axle end 2a. The aim of such a groove 2h is to avoid stress concentration in a corner.

The axlebox assembly 1 comprises two rolling bearings 3a and 3b, a cover 4 and a backing ring 5.

Since the two rolling bearings 3a and 3b are identical in this example, only one of them, having the reference "a" will be described here, it being understood that the identical elements of the other rolling bearing 3b bear the reference "b" in the figures.

The rolling bearing 3a comprises an inner ring 6a, an outer ring 7a and one row of rolling elements 8a, here rollers. The rolling bearing 3a may also comprise a cage or spacers (not represented) to maintain uniform circumferential spacing of the rolling elements 8a.

The inner ring 6a comprises an outer surface 9a of revolution forming a raceway for the rolling elements 8a. It also comprises a bore 10a and two lateral radial surfaces 11a and 12a.

The outer ring 7a comprises an outer surface 13a, a bore 14a and two lateral radial surfaces 15a and 16a. The bore 14a forms a raceway for the rolling elements 8a.

The rolling bearing 3a has an axis X3a of relative rotation between the inner ring 6a and the outer ring 7a.

The two rolling bearings 3a, 3b are mounted on the axle end 2a such as the bores 10a, 10b of the inner rings 6a, 6b are in axial contact with the outer surface 2e of the axle end 2a.

The two rolling bearings 3a, 3b are adjacent such as the lateral radial surface 12a of the inner ring 6a and the lateral radial surface 16a of the outer ring 7a of the rolling bearing 3a are in radial contact with the lateral radial surface 11b of the inner ring 6b and the lateral radial surface 15b of the outer ring 7b of the rolling bearing 3b respectively.

In normal use, the axis X3a, X3b are coincident with the axis X2.

The cover 4 of the axlebox assembly 1 comprises a plate 17 which is axially extended by an annular rim 18 towards the rolling bearing 3a. The rime comprises a lateral radial surface 19 bearing against the lateral radial surface 11a of the inner ring 6a of the rolling bearing 3a.

The cover 4 comprises through holes 20 wherein screws 21 are inserted for cooperating with through holes 2i made on the lateral radial surface 2d of the axle end 2a. The cover 4 is then securely fastened to the rotating axle 2 and exerts an axial load on the rolling bearings 3a, 3b through the rim 18.

The backing ring 5 of the axlebox assembly 1 comprises a main body 22 with a bore 23, two lateral radial surfaces 24 and 25 and an outer surface 26. The outer surface 26 comprises two protruding portions 27 extending radially towards the exterior of the axlebox assembly 1. The protruding portions 27 are designed to cooperate with an axlebox housing (not represented) such as to form a labyrinth isolating the axlebox interior from the outside.

The backing ring 5 is mounted on the axle end 2a and axially interposed between the rolling bearing 3b and the shoulder 2b of the axle 2. The lateral radial surface 24 is in radial contact with the lateral radial surface 12b of the inner ring 6b of the rolling bearing 3b. The bore 23 is in axial contact with the outer surface 2e of the axle end 2a.

The main body 24 of the backing ring is made in a rigid material, for example a metallic material.

The backing ring 5 has an axis X5 which is coincident with the axis X2 in normal use.

According to the invention, the backing ring 5 also comprises a deformable portion 28.

Figure 2B:
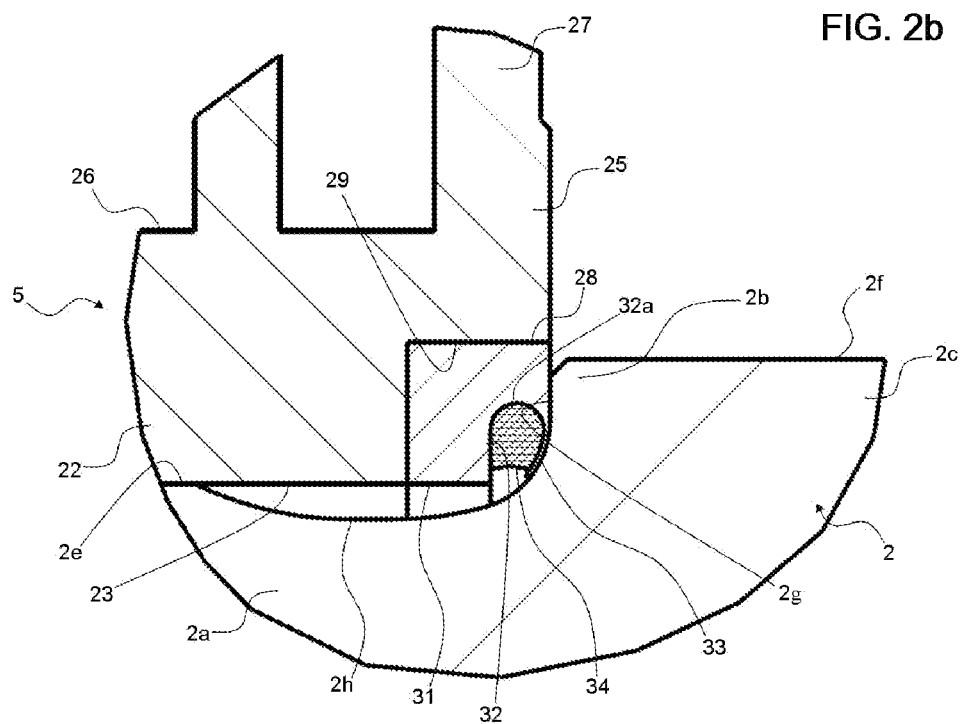
FIG. 2b is a detailed view of a deformable portion according to a first embodiment of the invention in a mounted state on an axle.

As illustrated in FIGS. 2a and 2b, the deformable portion 28 is annular and inserted in a peripheral recess 29 made on the main body 22 of the backing ring 5.

The deformable portion 28 is made in a softer material than the main body 24, for example a spring metal or a polymer. The deformable portion 28 may be overmoulded on the main body 22.

The deformable portion comprises a lateral radial surface 30 and a bore 31. The bore 31 is provided with an annular groove 32 that defines a rim 33 of lateral radial surface 30.

In this example, the lateral radial surface 30 of the deformable portion 28 is in the extension of the lateral radial surface 25 of the main body 22.

An annular elastic ring 34 is inserted in the annular groove 32.

During the mounting process of the axlebox assembly 1 on the axle 2, the backing ring 5 is axially translated on the outer surface 2e of the axle 2, by press fitting for example. As illustrated in FIG. 2a, the rim 33 of the deformable portion 28 extends radially in its free state before the mounting of the backing ring 5 on the axle 2.

As illustrated in FIG. 2b, the backing ring 5 is axially translated to have the lateral radial surface 30 in radial contact with the radial surface 2g of the shoulder 2b on the axle 2 at a given exerted load value for avoiding tolerance issues with the components of the axlebox assembly 1 successively mounted on the axle end 2a.

The rim 33 and the annular ring 34 inserted in the groove 32 of the deformable portion 28 are compressed and deformed against the abutment of the axle 2, in particular the rim 33 fits the rounded shape of the groove 2h on the axle end 2a.

Compared to a rigid and non-deformable backing ring, the deformable portion 28 permits a larger contact surface with the abutment of the axle 2 since the deformable portion 28 is in contact with both the radial surface 29 of the shoulder 2b and a portion of the rounded groove 2h on the axle end 2a. An increased load can be uniformly exerted on the rolling bearings 3a, 2b by the cover 4, and then through the backing ring, during the press fitting process.

Moreover, the backing ring 5 transmits and damps the axial loads exerted from the cover 4 and the lateral loads from a switch rail, for example, during the train use. Then a large contact surface between the backing ring 5 and the abutment of the axle 2 permits to increase the preload on the rolling bearings 3a, 3b and to reduce their micro-displacements on the axle end 2a that could create wear of the axle 2.

The inner diameter of the bottom 32a of the annular groove 32 is strictly smaller than the outer diameter of the outer surface 2f of the axle main portion 2c. Then the compressed portion of the deformable portion 28 against the radial surface 2g of the shoulder 2b is massive and more rigid than the rim 33 strongly deformed against the groove 2h. Such a design rule permits the deformable portion 28 to support an increased load.

Figure 3:
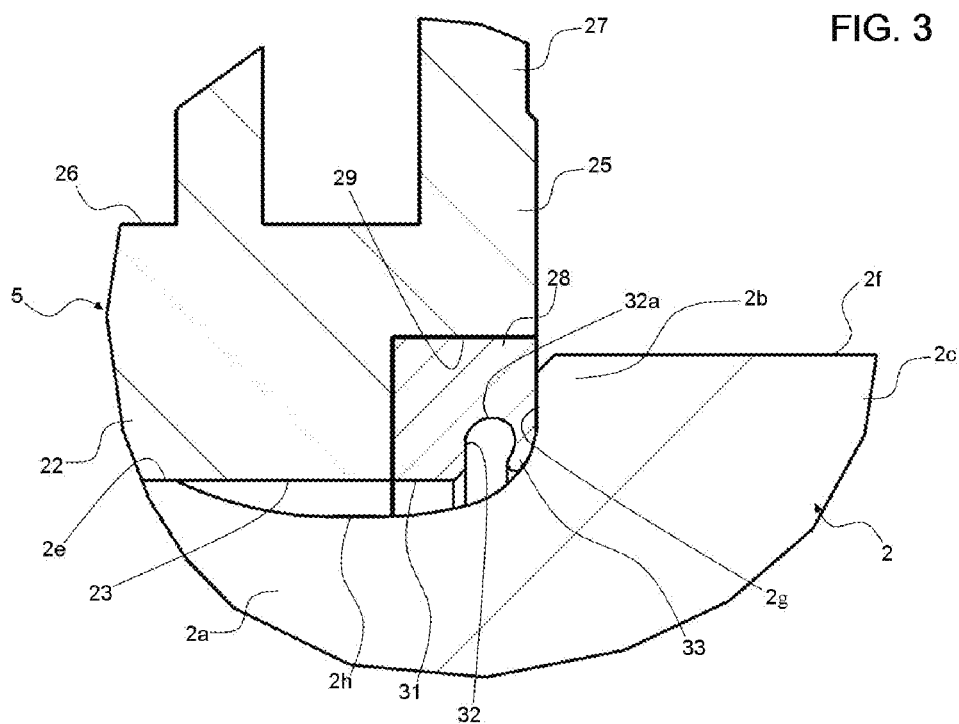
FIG. 3 is a detailed view of a deformable portion according to a second embodiment of the invention in a mounted state on an axle.

The second embodiment illustrated in FIG. 3, in which identical elements bear the same references, differs from the embodiment of FIGS. 2a and 2b in that the annular groove 32 is empty. This could be achieved by a specific material for the deformable portion 28, such as polyamide, and a sufficient width for the rim 33.

Figure 4:
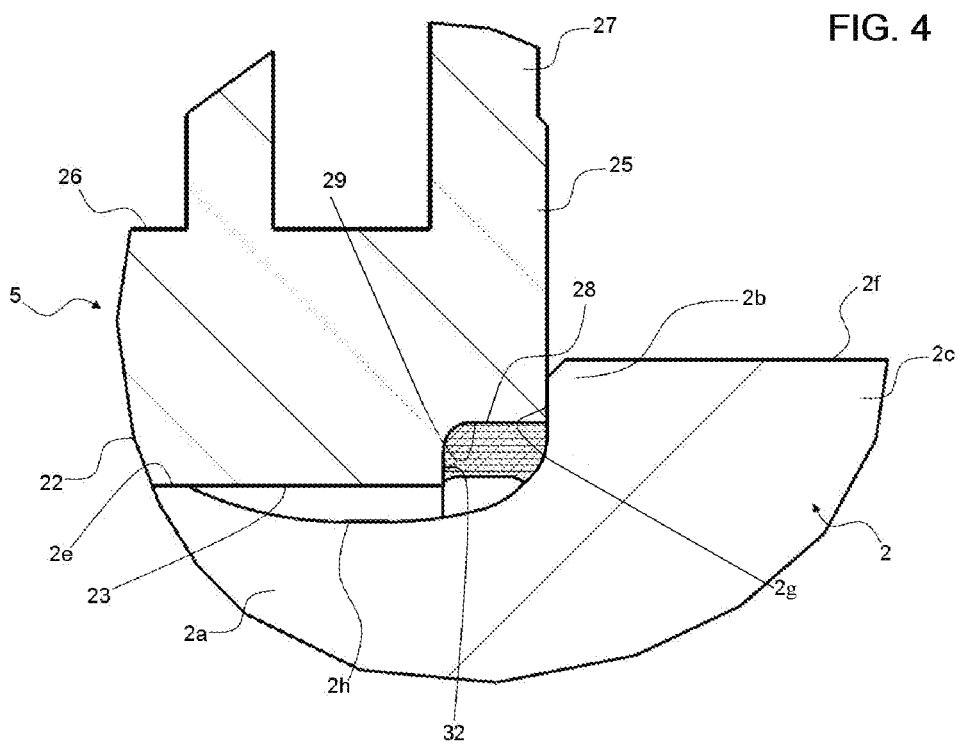
FIG. 4 is a detailed view of a deformable portion according to a third embodiment of the invention in a mounted state on an axle.

The third embodiment illustrated in FIG. 4, in which identical elements bear the same references, differs from the previous embodiments in that the deformable portion 28 does not comprise any groove.

The deformable portion 28 may be an annular elastic ring or an elastic element overmoulded onto the main body 22.

In the example of FIG. 4 illustrating this third embodiment of the invention, the main body 22 and the deformable portion 28 are both in contact with the abutment of the axle 2.

The lateral radial surface 25 of the main body 22 is in radial contact with the radial surface 2g of the shoulder 2b forming an abutment for the axle 2. The lateral radial surface 30 of the deformable portion 28 is in contact with both the radial surface 2g of the shoulder 2b and a portion of the rounded groove 2h of the axle end 2a.

The invention also concerns a railway bogie comprising an axle 2 and an axlebox assembly 1 according to one the previous embodiments.

The invention claimed is:

1. An axlebox assembly comprising:
at least one rolling bearing designed to be mounted on an axle, a cover designed to be fastened with the axle such as to axially maintain the at least one rolling bearing between the cover and an abutment of the axle, and
a backing ring mounted on the axle between the at least one rolling bearing and the abutment, wherein
the backing ring provides a deformable portion including an annular groove that fits the shape of the abutment of the axle.

2. The axlebox assembly according to claim 1, wherein the deformable portion of the backing ring is made of an elastic material.

3. The axlebox assembly according to claim 2, wherein the backing ring further comprises a main body made of a metallic material and the deformable portion made of an elastic material and fastened to the said main body.

4. The axlebox assembly according to claim 1, wherein the deformable portion further comprises a rim radially inwardly extending and in contact with the abutment of the axle.

5. The axlebox assembly according to claim 1, wherein the annular groove of the deformable portion defines the rim in contact with the abutment of the axle.

6. The axlebox assembly according to claim 5, wherein the rim of the deformable portion extends radially in its free state.

7. The axlebox assembly according to claim 6, wherein an annular elastic ring is inserted in the annular groove of the deformable portion.

8. The axlebox assembly according to claim 7, wherein the inner diameter of the bottom of the annular groove of the deformable portion is strictly smaller than the outer diameter of the abutment of the axle.

9. The axlebox assembly according to claim 8, wherein the main body and the deformable portion of the backing ring are both in contact with the abutment of the axle.

10. The axlebox assembly according to claim 8, wherein the deformable portion is the only component of the backing ring to be in contact with the abutment of the axle.

11. The axlebox assembly according to claim 10, wherein the abutment of the axle is positioned in a shoulder between an axle end having a smaller outer diameter than the adjacent axle portion, the shoulder comprising a radial surface bearing against the backing ring, the radial surface extending radially with a groove of rounded shape on the axle end on which the deformable portion of the backing ring substantially fits.

12. The axlebox assembly according to claim 11, wherein the inner diameter of the bottom of the annular groove of the deformable portion is closer to the diameter of the junction between the radial surface and the groove of the shoulder of the axle than the outer diameter of the shoulder of the axle.

13. A railway bogie comprising:
an axle, and
an axlebox assembly having;
at least one rolling bearing designed to be mounted on an axle, a cover designed to be fastened with the axle such as to axially maintain the at least one rolling bearing between the cover and an abutment of the axle, and a backing ring mounted on the axle between the at least one rolling bearing and the abutment, wherein the backing ring provides a deformable portion including an annular groove that fits the shape of the abutment of the axle.

14. The railway bogie of claim 13, wherein the annular groove of the deformable portion defines a rim in contact with the abutment of the axle in a mounted state.

* * * * *